Aug. 8, 1967 C. G. BOLTON, JR 3,334,860
FLUID COUPLING
Filed July 13, 1964 2 Sheets-Sheet 1

INVENTOR:
Cecil G. Bolton Jr.

Smyth, Roston & Pavitt
Attorneys

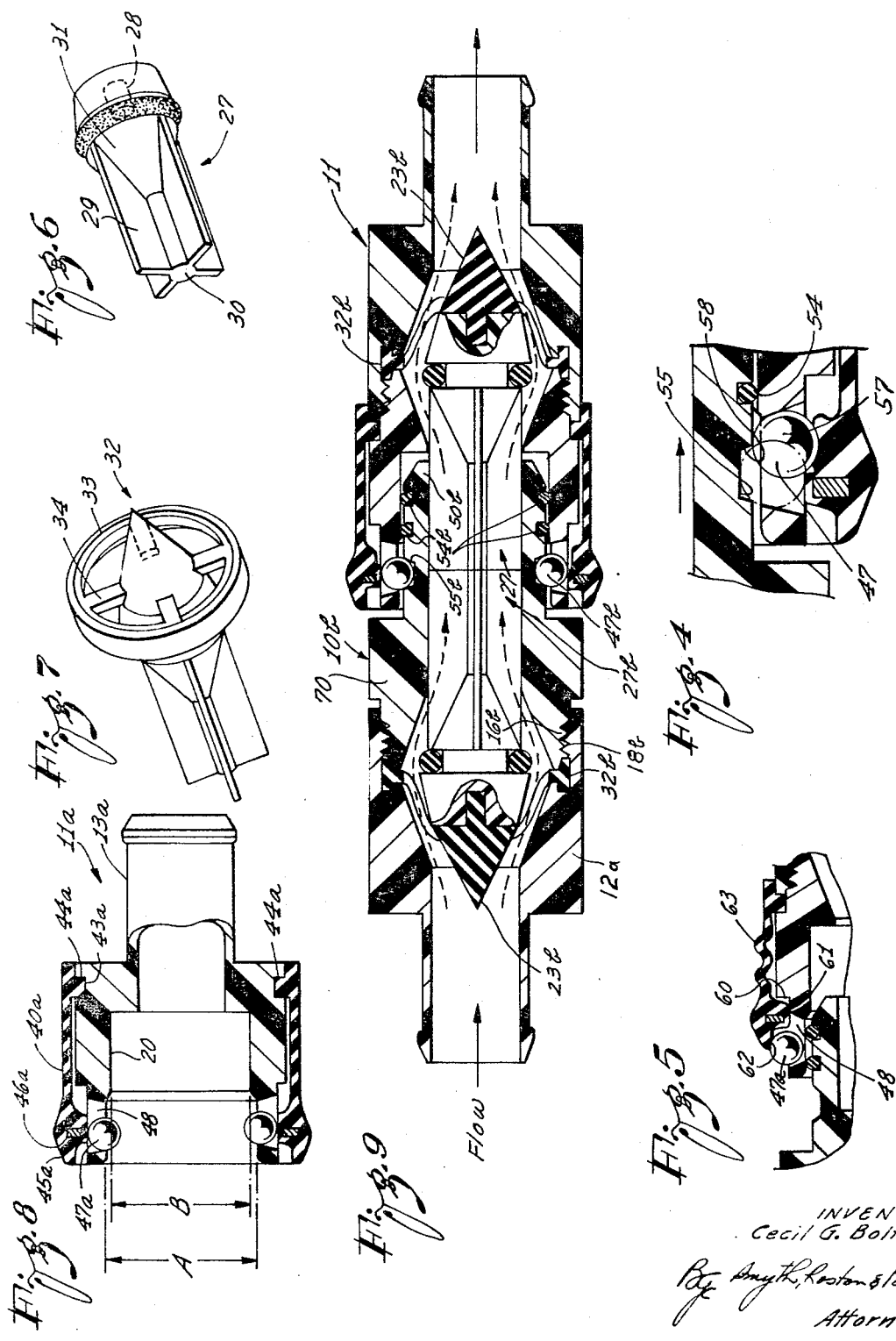

United States Patent Office 3,334,860
Patented Aug. 8, 1967

3,334,860
FLUID COUPLING
Cecil G. Bolton, Jr., 1036 S. Sandy Hook St.,
West Covina, Calif. 91790
Filed July 13, 1964, Ser. No. 382,319
6 Claims. (Cl. 251—149.1)

This invention relates to improvements in quick-disconnect fluid couplings for the transfer of fluid from one body such as a tank or any source of fluid to another.

In conventional fluid couplings, there is provided a pair of mating body members, one of which is provided with a metallic sleeve surrounding said one body member and which is used to aid in locking the body members together to complete the fluid coupling for the transfer of fluid from one body member to the other. This metallic sleeve must be retracted from a locking position during coupling and uncoupling of the body members to free some type of locking device which said sleeve holds in locking engagement with the other body member during coupling engagement. A metallic spring is also provided to return the metallic sleeve from its retracted position to its locking position and a retaining clip must be provided to retain the sleeve in position on the assembly.

In the present invention, the fluid coupling body member is provided with a locking sleeve of a plastic material such as Neoprene, or natural or synthetic rubber, which performs all the functions of the prior art sleeves, and in an improved manner. This locking sleeve surrounds the body member of the fluid coupling and remains in a static position during the connection and locking of one body member to another body member for completion of the fluid coupling, i.e., retraction is not required during connection. This sleeve then can be easily retracted so as to uncouple the body members by utilizing the resilient properties of the plastic material. Metallic springs and retaining clips heretofore used with metallic locking sleeves, are eliminated and the plastic sleeve has the additional advantage of forming a seal around the body member to prevent grit and other foreign material entering between the sleeve and the locking means which heretofore has caused jamming in fluid couplings. Also, present-day conventional fluid coupling body members are provided with valve components which are urged by metallic springs toward the valve seat to provent the flow of fluid through the body member when the body members are uncoupled.

In the present invention, the valve is mounted in the body member by a spider of resilient plastic material which performs the function of the metallic springs of prior art couplings, yet eliminates the complexities and problems involved in the use of such metallic springs.

Still another feature is that a fluid coupling constructed in accordance with the teachings of this invention can handle corrosive materials with no adverse effect.

Other and additional features of the present invention will become apparent from a more detailed description of the drawings, wherein:

FIGURE 4 is an enlarged detail view showing how the locking elements utilize the properties in the plastic of the sleeve to engage and lock during the coupling of the body members;

FIGURE 5 is a detail view of the plastic sleeve retracted to permit the locking elements to unlock during uncoupling of the body members;

FIGURE 6 is a perspective view of a fluted valve component of one body member which cooperates with the other body member to open the valve during coupling;

FIGURE 7 is a perspective view of the valve and the valve spider for mounting the valve in one of the body members;

FIGURE 8 illustrates a body member where the valve arrangement is not needed; and FIGURE 9 illustrates body members, each having valves where the needs of the system in which the fluid coupling is used require the same.

Figure 1:
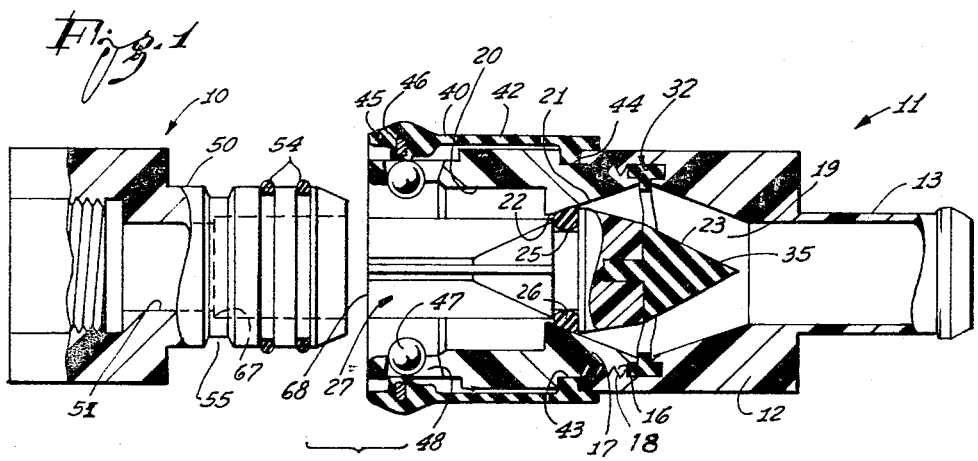
FIGURE 1 is an elevational view, partly in section, illustrating the body members forming the fluid coupling constructed in accordance with the teachings of this invention and in a position prior to being coupled together.

Turning now to FIGURE 1, it can be seen that the first body member of the fluid coupling is indicated in its entirety as 10 and the second body member is indicated in its entirety as 11. Body member 11 comprises a first body section 12 having a reduced flange extension 13 for telescoping or coupling to a hose such as 14 (see FIGURE 3). The other end of the body section 12 is provided with internal threads 16 to receive second body section 17 threaded at one end as at 18 to cooperate with threads 16 of body section 12 to form the body member 11. Body sections 12 and 17 are internally bored as at 19 and 20 to form a passage to permit the flow of fluid therethrough and body section 17 is also provided with a radially inwardly extending conical surface 21 which forms a valve seat 22 for axially movable valve 23, the latter restricting the flow of fluid through the coupling when engaged with valve seat as illustrated in FIGURE 1.

Valve 23 comprises a main body 24 externally peripherally notched or grooved as at 25 to receive an O-ring 26 which serves to sealingly engage the valve seat 22. Valve 23 is also provided with a fluted extension 27 which extends from the O-ring 26 to approximately the end of the body section 18 and is removably attached to the valve 23 by any suitable means such as a pin and socket arrangement 28 as most clearly shown by FIGURES 1, 6 and 7, and is movable as part of the valve in the coupling passage. As more clearly shown in FIGURE 6, the valve extension 27 comprises four radially extending walls 29 located about a narrow stem 30 and merge into a tapered wall 31 which merges adjacent the O-ring 26 to present a smooth contour for the flow of fluid. Thus, the walls 29 and stem 30 together with the tapered wall 31 form a passage for fluid entering the coupling and flowing past the valve 23 and into the body extension 13.

Valve 23 is held into proper engagement with the valve seat 22 by means of a plastic spider indicated in its entirety as 32 and which comprises an annular peripheral ring 33 with a plurality of radially extending plastic legs 34 which connect the peripheral ring 33 with the tapered end portion 35 of the valve 23. The spacing of the plastic Turning now to first body member 10, as shown in the spider and, in the embodiment shown, the ring 33 is held in place at the junction between the body sections 12 and 17 by threading the section 18 into the section 12. In addition, the ring 33 forms a seal between body sections 12 and 17 to prevent external leakage of the fluid material.

Body member 11 is also provided with a peripheral external plastic locking sleeve 40 having a relatively thin portion 42. Locking sleeve 40 is suitably attached to the body member 11 as by providing a radially inwardly extending rim 43 inserted into a groove 44 formed between the body sections 12 and 17. The other end of the locking sleeve 40 near the end of the body section 17 is thickened to provide a stiffness to the locking sleeve adjacent this end and to form a raised gripping surface 45, which can be used for retraction of the locking sleeve by hand. Locking sleeve 40 also has a ring 46 embedded in its thickened portion, which ring being of any suitable material, such as rigid plastic or metal, serves to hold and maintain radially movable locking elements in place in the body section 17, which elements, in the embodiment shown, are a plurality of balls 47 spaced radially about the body member 11 in elongated grooves 48, large enough to permit slight axial movement and outward radial movement, but tapered narrow enough to restrict inward radial movement, thus preventing the balls from falling out.

Figure 2:
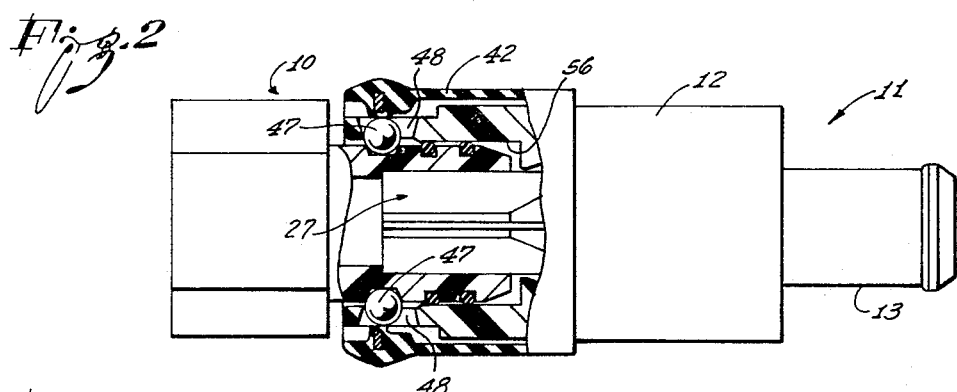
FIGURE 2 illustrates the body members shown in FIGURE 1 in coupled position, the body members being illustrated partly in section.
Figure 3:
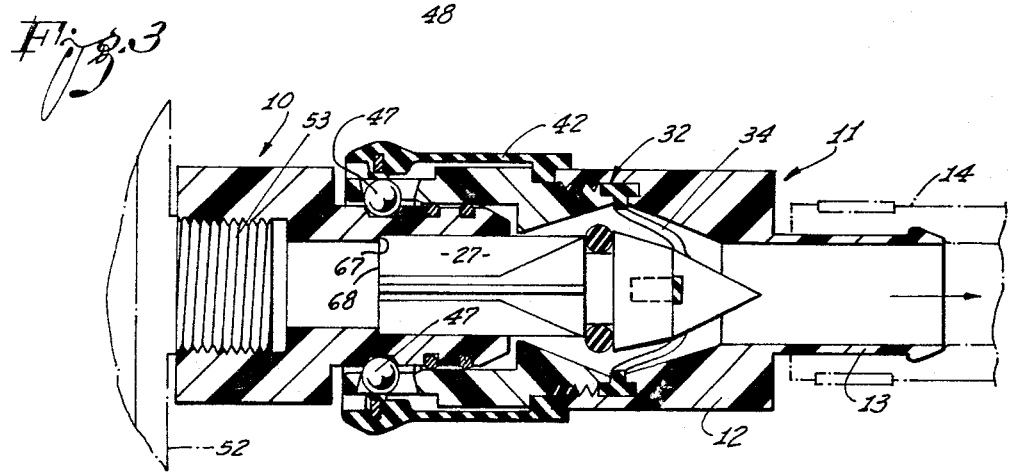
FIGURE 3 shows the fluid coupling in its coupled position with the valve open for the passage of fluid and shown attached to a source of fluid for the transfer of this fluid to another body.

Turning now to first body member 10, as shown in FIGURE 1, it can be seen that this body member is formed with a reduced telescoping portion 50 which is telescopingly insertable into the body member 11 for coupling engagement therewith to permit the passage of fluid through its internal bore 51 from a source of fluid pressure such as tank 52 coupled therewith as by threading, illustrated at 53 in FIGURE 3. Extension 50 is provided with a pair of O-rings 54 to prevent leakage from between the body members when coupled and is further provided with a peripheral locking groove 55. When the first body member 10 is inserted into the second body member 11, as illustrated in FIGURE 2, it can be seen that the O-ring seals 54 sealingly engage the inner walls 56 of the bore 20 and the radially movable locking elements are seated in the locking groove 55 and maintained therein by operation of the locking sleeve 40 and ring 46 radially adjacent thereto., As hereinbefore mentioned, one of the features of the present invention is the utilization of the inherent resiliency of the plastic material of the locking sleeve 40 so that the radially movable locking elements 47 may be held or maintained ready to move radially into locking position while the extension 50 is telescoped into the body member 11. FIGURE 4 illustrates to advantage the deformation as at 57 of the locking sleeve 40 at the thickened portion permitting the locking elements 47 to ride over the O-ring seals 54 and the main portion of the extension 50 until the locking groove 55 is substantially radially opposite the radial locking elements. In FIGURE 4, the locking elements 47 are poised near the edge 58 of the groove 55 and are urged into the groove 55 due to the resiliency of the locking sleeve 40 to recover its shape after deformation. As also shown in FIGURE 4, the locking elements 47 are permitted to move axially within the confines of the slots 48 and relatively free of the operation of the ring 46 until the locking groove 55 is in a position to allow the locking elements to be forced therein, at which time any rearward motion of the body member 10 causes the locking elements to move rearward and radially outward toward the ring 46 which serves to hold the locking elements in the locking groove to maintain the body members coupled together.

As also hereinbefore mentioned, by utilization of the property of the plastic material of the locking sleeve 40, the sleeve may be retracted by simply grasping the edge 45 of the thickened portion and pulling the latter in a direction away from the body member 10, that is, to the right as shown in the drawings, whereupon the locking elements are free of the influence of the ring 46 and can move radially outward to permit easy withdrawal of the coupling body member 10, as more clearly illustrated in FIGURE 5. Radially extending shoulder 60 of the groove 61 in which the thickened portion of the locking sleeve 40 rests, provides a stop for the thickened portion in its retracted position so that the lip 62 of the thickened portion of the locking sleeve is still in a position to maintain the locking elements 47 within the confines of their respective grooves 48.

In connection with the retracted position of the sleeve, the undulations 63 (see FIGURE 5) illustrate the manner in which the sleeve member, being plastic, may be retracted about this outer periphery of the body member, and, being resilient, returns to its original position when released, as in FIGURE 8.

The thickened portion 45 of the locking sleeve 40 has another advantage in that it may serve to protect the body member against damage should the coupling be dropped. This is important primarily when the body member is made of a hard plastic material that is more sensitive to impact than metal. FIGURE 5 also shows a means for preventing damage to the O-ring seals 54 as the body members are coupled and uncoupled, and which takes the form of an enlarged diameter of the inner bore 20 of the body member 11 in the region of the grooves 48. The depth of this enlarged diameter is more clearly shown in FIGURE 8 where arrows A represent the enlarged diameter and arrow B represents the diameter of the bore 20.

In connection with FIGURE 8, it can be seen that there is illustrated therein a body member 11a identical in function and operation to the body member 11 as previously described except that this body member 11a is made of one piece with the radially inwardly extending shoulder 43a of the sleeve 40a extending into a groove 44a located in the main portion of the body member rather than in between two body sections such as shown in FIGURE 1. Otherwise, the structure of this body member is identical and like reference numerals identify parts having like function in the previously described figures except that a suffix a is added. This body member is used where the needs of the system do not require a valve such as previously described in connection with the body member 11.

Turning again to FIGURES 1–7, inclusive, but in particular to FIGURE 3 where the body members 10 and 11 are shown coupled together, it is to be noted that the body member 10 is provided with a radially inwardly extending shoulder 67 which engages the very end 68 of the fluted valve member 27 as the coupling members are coupled so that when coupled the valve 23 is open as shown in FIGURE 3 by deforming (stretching) the legs 34 of the spider 32. Obviously, the relationship of the shoulder 67 is such that it engages the end 68 of the fluted valve member 27 as the coupling members are telescoped together forcing the valve 23 to its fully open position in the final or complete coupling relationship of the body members and as the body members are uncoupled, the resiliency of the legs 34 force the valve closed to assume the position again as shown in FIGURE 1 with the sealing ring 26 engaged with the valve seat 22. Note that in this closed position, the legs 34 of the valve spider are still in a slightly stretched position causing a positive force to be exerted at the sealing ring to prevent leakage even under conditions of low fluid pressure. See FIGURE 7 for an illustration of the valve spider when at rest or when removed from the assembly.

Turning now to FIGURE 9, it can be seen that a body member 10b is used in connection with a body member 11 to form a fluid coupling having a check valve in each of the body members. Body member 11 being identical to the previously described body member 11, no further description thereof at this point is deemed necessary. Body member 10b on the other hand is now formed of two sections, body section 12a, identical to body section 12 of body member 11, and body section 70. Body section 70 differs from the body sections previously described in that it is now formed like body member 10, i.e., it is provided with a reduced tubular telescoping portion 50b and with O-ring seals 54b and a locking groove 55b, all of which perform like the similarly referenced parts and for that reason were given similar reference numerals with the addition of the suffix b. This is also true of the valve 23b, spider 32b, fluted valve element 27b, and all other parts similarly referenced. However, unlike body member 10, the body section 70 is provided with external threads 18b to be received in internal threads 16b to form body member 10b and hold spider 32b therebetween.

This fluid coupling as shown in FIGURE 9 differs, however, in that the shoulder 67 is not present in member 70 and the opening and closing of the valve 23 of the body member 11 and likewise the valve 23b of body member 10b as the body members are coupled and uncoupled is accomplished by the fluted valve members 27 and 27b placed in abutting relationship as shown, and removed from such a position when uncoupled.

As hereinabove mentioned, the locking sleeves 40 and 40a and spiders 32 and 32a and 32b, including parts 33, 34 and 35, are of a resilient plastic. For purposes herein, such plastic can be neoprene or any suitable synthetic rubber or rubber-like material. The fluted valve members 27, 27a and 27b must be made of a rigid material such as would be used for the construction of the body members.

As for the body members themselves, a plastic material such as polyvinylchloride (PVC), or materials sold under the trademarks Nylon, Deldrin or Teflon may be used which could, of course, make the coupling usable for handling corrosive materials. Too, if desired, the body members and the rigid valve members may be made of metal such as stainless steel, brass or aluminum when required for use under conditions of high temperature and/or pressure, or when the fluid material to be handled by the coupling is not sufficiently corrosive to damage the metal parts.

The foregoing disclosure and descripion of the invention are for illustrative purposes only and do not in any way limit the invention which is defined by the claims which follow. For example, the flow of the fluid through the body members is shown from body member 10 to body member 11; whereas, in fact, the flow could be in the other direction, that is, flowing from body member 11 to body member 10 with equal facility.

What is claimed is:

1. In a fluid coupling having first and second body members:
    there being bores in said body members,
    said body members being axially translated during the coupling and uncoupling thereof,
    an axially movable valve and a valve seat within said second body member for regulating the fluid flow through said second body member,
    axially shiftable means in said second body member for shifting said valve to open position,
    said axially shiftable means including a portion normally having a substantially radial disposition and being deformable to a substantially axial disposition and being capable of being axially elongated in the axial disposition to obtain a shifting of said valve to an open position relative to said valve seat,
    means carried by said first body member for engaging with said axially shiftable means to axially deform and elongate said portion of said axially shiftable means during relative axial movement of said body members toward each other during the coupling of said first and second members,
    radially movable locking means carried by said second body member,
    a peripheral groove defined on said first body member, and
    resilient locking means mounted on said second body member for maintaining said radially movable locking means in locking engagement with said peripheral groove in said first locking members upon complete connection of said body members to lock said body members together,
    said resilient locking means being coupled to said second body member at one end and being disposed in enveloping relationship to said locking means at a second end opposite to the first end,
    said resilient locking means being retractible axially at the second end while being fixedly positioned at the first end for radial displacement of said radially movable locking means during uncoupling of said body members.

2. In a fluid coupling having first and second body members:
    there being bores in said body members,
    said body members being axially translated during the coupling and uncoupling thereof,
    axially movable valve means and a valve seat within said second body member for regulating the fluid flow through said second body member,
    means carried by said first body member for engaging with and shifting said valve means to open position during relative axial movement of said body members toward each other during the coupling of said body members,
    radially movable locking means carried by said second body member,
    a peripheral groove defined on said first body member,
    resilient means mounted on said second body member at one end and enveloping said locking means at a second end opposite to the first end for maintaining said radially movable locking means in locking engagement with said peripheral groove on said first body member upon complete connection of said body members to lock said body members together,
    said resilient means being retractible axially at the second end while being disposed in fixed positioning on the first end for radial displacement of said radially movable locking means during uncoupling of said body members, and
    resilient means mounting said axially movable valve means in said second body member in a substantially radial position for holding said valve means in engagement with its seat and restricting the flow of fluid through the body member and being deformable to a substantially axial position and being capable of being elongated in the axial position during a coupled relationship of the body members to provide for the flow of fluid through the body members and to cause said valve means to return to its valve seat when said body members are uncoupled.

3. In a fluid coupling having first and second body members:
    there being bores in said body members,
    said body members being axially translated during the coupling and uncoupling thereof,
    an axially movable valve and a valve seat within said second body member for regulating the fluid flow through said second body member,
    axially shiftable means in said second body member for shifting said valve to open position,
    means carried by said first body member engaging with said axially shiftable means and shifting said valve to open position during relative axial movement of said body members toward each other during the coupling thereof,
    radially movable locking means carried by said second body member,
    a peripheral groove defined on said first body member,
    resilient locking means mounted on said second body at one end enveloping the locking means at a second end opposite to the first end member for maintaining said radially movable locking means in locking engagement with said peripheral groove upon complete connection of said body members to lock said body members together,
    said resilient locking means being retractable axially at the second end while being fixedly positioned at the first end for radial displacement of said radially movable locking means during uncoupling of said body members, and
    said axially shiftable means including resilient means mounting said axially movable valve in said second body member and having a substantially radial position for holding said valve in engagement with its seat to restrict the flow of fluid through the body member and being deformable to a substantially axial position and being axially elongatable during coupling relationship of the body members to provide for the flow of fluid through the body members and to cause said valve to return to its valve seat when said body members are uncoupled.

4. The fluid coupling claimed in claim 3, wherein said resilient means mounting said valve in said second body member comprises means of rubber-like material.

5. The fluid coupling claimed in claim 3, wherein one of said body members includes a portion having sealing means operable where one of said body members is inserted telescopically in the other body member to prevent leakage from between said body members when coupled.

6. The fluid coupling described in claim 5, and further including means on one of said members for preventing damage to said sealing means during coupling and uncoupling of said body members.

References Cited
UNITED STATES PATENTS

| 471,011 | 3/1892 | Martin | 137—525 XR |
|---|---|---|---|
| 2,355,862 | 8/1944 | Harper | 137—525 |
| 2,503,495 | 4/1950 | Koester | 251—149.6 |
| 2,706,646 | 4/1955 | Olson | 137—614.04 |

WILLIAM F. O'DEA, *Primary Examiner.*

H. M. COHN, *Assistant Examiner.*

UNITED STATES PATENT OFFICE

CERTIFICATE OF CORRECTION

Patent No. 3,334,860                                  August 8, 1967

Cecil G. Bolton, Jr.

It is hereby certified that error appears in the above numbered patent requiring correction and that the said Letters Patent should read as corrected below.

In the heading to the printed specification, lines 3 and 4, for "1036 S. Sandy Hook St., West Covina, Calif. 91790" read -- 5271 Harvard Ave., Westminster, Calif. 92683 --; column 2, lines 57 and 58, for "Turning now to the first body member 10, as shown in" read -- legs 34 about the periphery permit the flow of fluid past --.

Signed and sealed this 29th day of October 1968.

(SEAL)
Attest:

Edward M. Fletcher, Jr.
Attesting Officer

EDWARD J. BRENNER
Commissioner of Patents